(12) United States Patent
Hsu et al.

(10) Patent No.: US 10,310,746 B2
(45) Date of Patent: Jun. 4, 2019

(54) METHOD, ASSOCIATED MEMORY DEVICE AND CONTROLLER THEREOF FOR PERFORMING DYNAMIC RESOURCE MANAGEMENT

(71) Applicant: Silicon Motion Inc., Hsinchu County (TW)

(72) Inventors: Che-Wei Hsu, Taichung (TW); Hsin-Hsiang Tseng, Hsinchu (TW)

(73) Assignee: Silicon Motion Inc., Hsinchu County (TW)

( * ) Notice: Subject to any disclaimer, the term of this patent is extended or adjusted under 35 U.S.C. 154(b) by 40 days.

(21) Appl. No.: 15/859,701

(22) Filed: Jan. 1, 2018

(65) Prior Publication Data
US 2019/0050154 A1 Feb. 14, 2019

(30) Foreign Application Priority Data

Aug. 8, 2017 (TW) .............................. 106126636 A

(51) Int. Cl.
*G06F 3/06* (2006.01)
(52) U.S. Cl.
CPC .......... *G06F 3/0613* (2013.01); *G06F 3/0659* (2013.01); *G06F 3/0679* (2013.01)
(58) Field of Classification Search
CPC ........................................... G06F 3/06–3/0689
See application file for complete search history.

(56) References Cited

U.S. PATENT DOCUMENTS

| 6,330,623 | B1 * | 12/2001 | Wu | ........................ | G06F 13/28 |
| | | | | | 710/23 |
| 6,697,885 | B1 * | 2/2004 | Goodfellow | ............ | G06F 13/28 |
| | | | | | 710/22 |

(Continued)

FOREIGN PATENT DOCUMENTS

| TW | 201617891 A | 5/2016 |
| TW | I581092 B | 5/2017 |

OTHER PUBLICATIONS

Awad, Amro, Brett Kettering, and Yan Solihin. "Non-volatile memory host controller interface performance analysis in high-performance I/O systems." 2015 IEEE International Symposium on Performance Analysis of Systems and Software (ISPASS). IEEE. (Year: 2015).*

*Primary Examiner* — Nicholas J Simonetti
(74) *Attorney, Agent, or Firm* — Winston Hsu

(57) ABSTRACT

A method for performing dynamic resource management in a memory device, the memory device, and a controller thereof are provided. The memory device includes a non-volatile (NV) memory, and the NV memory includes a plurality of NV memory elements. The method may include: storing a plurality of sets of physical region descriptor (PRD) information related to a plurality of host commands, respectively, and storing a plurality of intermediate PRDs respectively corresponding to the plurality of sets of PRD information into a first queue; obtaining an intermediate PRD of the plurality of intermediate PRDs from the first queue, and storing the intermediate PRD into a second queue; sending a command to the NV memory according to the intermediate PRD in the second queue to access data; and when an operation of accessing the data is successful, releasing the intermediate PRD from the second queue to the first queue.

20 Claims, 6 Drawing Sheets

(56) References Cited

U.S. PATENT DOCUMENTS

| | | | |
|---|---|---|---|
| 2008/0320176 A1* | 12/2008 | Gao | G06F 13/28 |
| | | | 710/17 |
| 2012/0278664 A1 | 11/2012 | Kazui | |
| 2016/0026386 A1 | 1/2016 | Ellis | |
| 2016/0070488 A1 | 3/2016 | Shaharabany | |
| 2016/0299844 A1 | 10/2016 | Sprouse | |
| 2017/0123732 A1 | 5/2017 | Shaharabany | |

\* cited by examiner

METHOD, ASSOCIATED MEMORY DEVICE AND CONTROLLER THEREOF FOR PERFORMING DYNAMIC RESOURCE MANAGEMENT

BACKGROUND OF THE INVENTION

1. Field of the Invention

The present invention relates to flash memory access, and more particularly, to a method, an associated apparatus, and a controller thereof for performing dynamic resource management in a memory device.

2. Description of the Prior Art

Developments in memory technology have enabled the wide application of portable memory devices, such as memory cards conforming to SD/MMC, CF, MS and XD specifications. Improving access control of memories in these portable memory devices remains an issue to be solved in the art.

NAND flash memories may comprise single level cell (SLC) and multiple level cell (MLC) flash memories. In an SLC flash memory, each transistor used as a memory cell may have either of two electrical charge values: logic values 0 and 1. In comparison, the storage ability of each transistor used as a memory cell in an MLC flash memory may be fully utilized. The transistor in the MLC flash memory can be driven by a voltage higher than that in the SLC flash memory, and different voltage levels can be utilized to record information of at least two bits (e.g. 00, 01, 11, or 10). In theory, the recording density of the MLC flash memory may reach at least twice the recording density of the SLC flash memory, and is therefore preferred by manufacturers of NAND flash memories.

The lower cost and larger capacity of the MLC flash memory means it is more likely to be applied in portable memory devices than an SLC flash memory. The MLC flash memory does have instability issues, however. To ensure that access control of the flash memory in the portable memory device meets required specifications, a controller of the flash memory is configured to apply management mechanisms for properly managing data access.

Related art memory devices with the above management mechanisms still have some disadvantages. For example, when performing some types of reading operations is required, the hardware resources for accessing management in the memory device may be insufficient, and thus lower the overall performance. Hence, there is a need for a novel method and a memory accessing mechanism to achieve optimal performance of a memory device without introducing side effects or in a way that is less likely to introduce side effects.

SUMMARY OF THE INVENTION

One objective of the present invention is to provide a method, an associated apparatus and a controller for performing dynamic resource management in a memory device in order to solve the above-mentioned problem.

Another objective of the present invention is to provide a method, an associated apparatus and a controller for performing dynamic resource management in a memory device in order to achieve optimal performance of the memory device without introducing side effects or in a way that is less likely to introduce side effects.

According to at least one embodiment of the present invention, a method for performing dynamic resource management in a memory device is provided. The memory device comprises a non-volatile (NV) memory, and the NV memory comprises a plurality of NV memory elements. The method comprises: storing a plurality of sets of physical region descriptor (PRD) information related to a plurality of host commands, respectively, and storing a plurality of intermediate PRDs respectively corresponding to the plurality of sets of PRD information into a first queue, wherein the plurality of host commands are received from outside the memory device, and any of the plurality of intermediate PRDs comprises an identifiers (ID) of a set in the plurality of sets of PRD information; obtaining an intermediate PRD of the plurality of intermediate PRDs from the first queue, and storing the intermediate PRD into a second queue; sending a command to the NV memory according to the intermediate PRD in the second queue, to access data in at least one NV memory element of the plurality of NV memory elements; and when an operation of accessing the data is successful, releasing the intermediate PRD from the second queue to the first queue.

According to at least one embodiment of the present invention, a memory device is provided. The memory device comprises an NV memory and a controller. The NV memory is arranged to store information, wherein the NV memory comprises a plurality of NV memory elements. The controller is coupled to the NV memory, and is arranged to control operations of the memory device, wherein the controller comprises a multi-queue type physical region descriptor (PRD) storage module and a processing circuit. The PRD storage module is arranged to store at least one PRD, wherein the multi-queue type PRD storage module comprises a PRD information register, a first queue, and a second queue. The processing circuit is arranged to control the controller according to a plurality of host commands from a host device, to allow the host device to access the NV memory via the controller. The controller stores a plurality of sets of PRD information related to the plurality of host commands into the PRD information register, respectively, and stores a plurality of intermediate PRDs respectively corresponding to the plurality of sets of PRD information into the first queue, wherein any of the plurality of intermediate PRDs comprises an identifier (ID) of a set in the plurality of sets of PRD information. The controller obtains an intermediate PRD of the plurality of intermediate PRDs from the first queue, and stores the intermediate PRD into the second queue. The controller sends a command to the NV memory according to the intermediate PRD in the second queue, to access data in at least one NV memory element of the plurality of NV memory elements. When an operation of accessing the data is successful, the controller releases the intermediate PRD from the second queue to the first queue.

According to at least one embodiment of the present invention, a controller of a memory device is provided. The memory device comprises the controller and an NV memory. The NV memory comprises a plurality of NV memory elements. The controller comprises a multi-queue type PRD storage module that is arranged to store at least one PRD. The multi-queue type PRD storage module comprises a PRD information register, a first queue, and a second queue. In addition, the controller further comprises a processing circuit. The processing circuit is arranged to control the controller according to a plurality of host commands from a host device, to allow the host device to access the NV memory via the controller. The controller stores a plurality of sets of PRD information related to the plurality of host commands into the PRD information register, respectively, and stores a plurality of intermediate PRDs respectively corresponding to the plurality of sets of PRD information into the first queue, wherein any of the plurality of intermediate PRDs comprises an identifier (ID) of a set in the plurality of sets of PRD information. The controller obtains an intermediate PRD of the plurality of intermediate PRDs from the first queue, and stores the intermediate PRD into the second queue. The controller sends a command to the NV memory according to the intermediate PRD in the second queue, to access data in at least one NV memory element of the plurality of NV memory elements. When an operation of accessing the data is successful, the controller releases the intermediate PRD from the second queue to the first queue.

By properly performing dynamic resource management, the present invention can properly control the operation of the controller to prevent there being insufficient hardware resources for access management in the memory device. In addition, implementing according to the embodiments of the present invention will not greatly increase additional costs, and may even be more cost-effective than related art techniques. Problems existing in the related arts can be solved, and the overall cost will not be greatly increased. The present invention may achieve optimal performance of the memory device without introducing side effects or in away that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

I. Memory System

Figure 1:
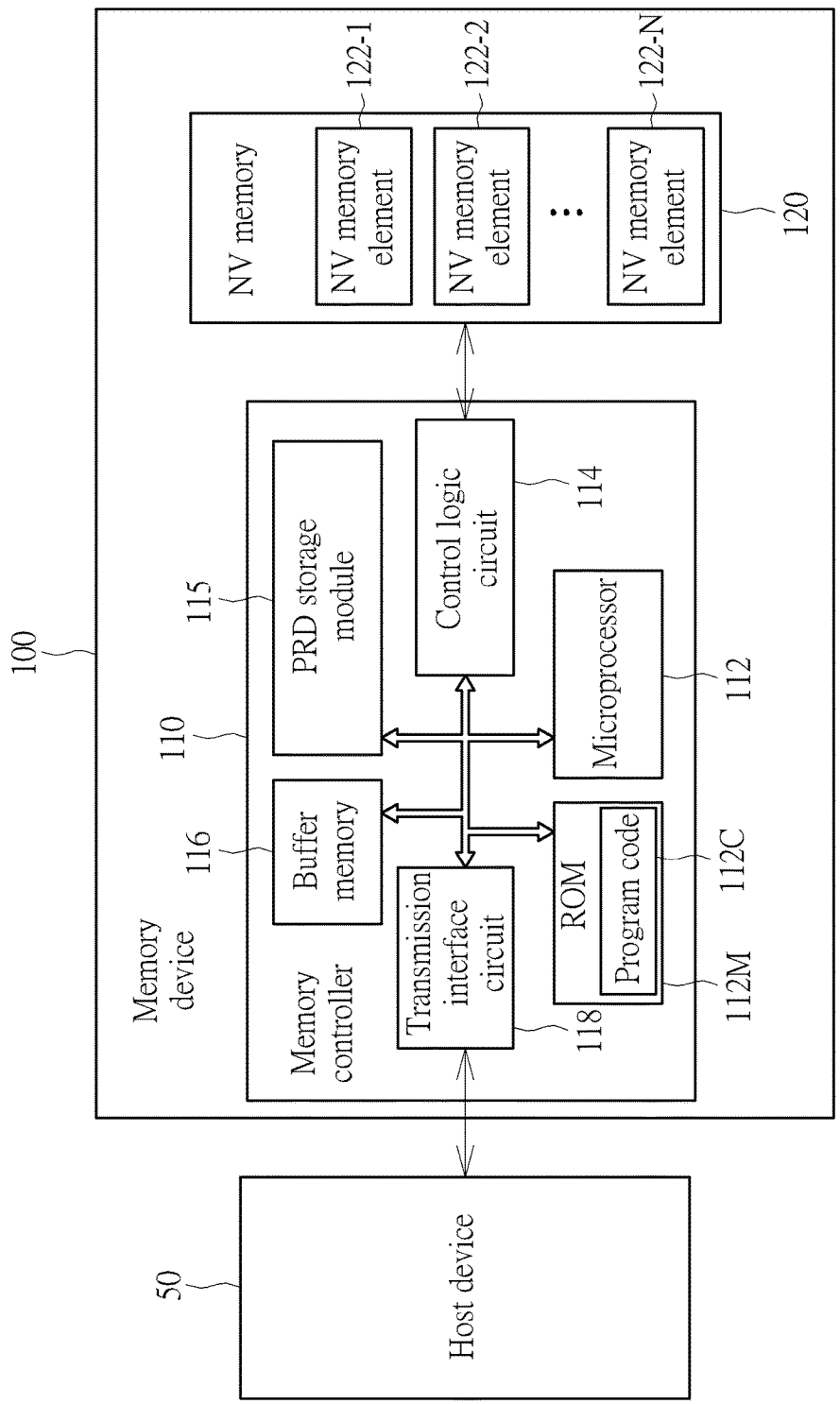
FIG. 1 is a diagram illustrating a memory device and a host device according to a first embodiment of the present invention.

Refer to FIG. 1, which is a diagram illustrating a memory device 100 and a host device 50 according to a first embodiment of the present invention. The memory device 100 may be a portable memory device (e.g. a memory card conforming to the SD/MMC, CF, MS or XD specification) or a solid state drive (SSD). In addition, examples of the host device 50 may comprise (but are not limited to): a multifunctional mobile phone, a tablet, a wearable device, and a personal computer (e.g. a desktop computer or a laptop computer).

According to this embodiment, the memory device 100 may comprise a controller such as a memory controller 110, and may further comprise a non-volatile (NV) memory 120, wherein the controller is arranged to access the NV memory 120, and the NV memory 120 is arranged to store information. The NV memory 120 may comprise a plurality of NV memory elements 122-1, 122-2, . . . , and 122-N, wherein the symbol "N" may represent an integer larger than 1. For example, the NV memory 120 may be a flash memory, and the NV memory elements 122-1, 122-2, . . . , and 122-N may be a plurality of flash memory chips (flash chips) or a plurality of flash memory dies (flash dies), but the present invention is not limited thereto.

As shown in FIG. 1, the memory controller 110 may comprise a processing circuit such as a microprocessor 112, a storage such as a read only memory (ROM) 112M, a control logic circuit 114, a physical region descriptor (PRD) storage module 115, a buffer memory 116, and a transmission interface circuit 118, wherein these components may be coupled to one another via a bus. The buffer memory 116 is implemented with a random access memory (RAM). The PRD storage module 115 may be arranged to store at least one PRD, and maybe implemented with any type of memory (e.g. the random access memory and/or any other memory), but the present invention is not limited thereto. Further, the ROM 112M of this embodiment is arranged to store a program code 112C, and the microprocessor 112 is arranged to execute the program code 112C in order to control access of the NV memory 120. Note that the program code 112C may also be stored in the buffer memory 116 or any type of memory. In addition, the control logic circuit 114 may comprise a error correction code (ECC) circuit (not shown) for protecting data and/or performing error correction, and the transmission interface circuit 118 may conform to a specific communications specification (e.g. the serial advanced technology attachment (SATA) specification, the universal serial bus (USB) specification, or the peripheral component interconnect express (PCIE) specification), and may perform communications according to this specific communications specification.

In this embodiment, the host device 50 may indirectly access the memory device 100 by transmitting a host command and a corresponding logical address to the memory controller 110. The memory controller 110 receives the host command and the logical address, and translates the host command into a memory operation command (hereinafter operation command, for brevity), and then controls the NV memory 120 to perform an operation such as reading, writing/programming, etc. upon a memory unit or a data page at a specific physical address which corresponds to a logical address. In the follow-up descriptions, the read operations of the NV memory 120 are taken as an example, but the present invention is not limited thereto.

II. Multi-Queue Mechanism

The memory controller 110 may queue multiple host commands and sequentially execute these host commands, and may ultimately send back operation results to the host device 50. The actual time for completion of executing the host commands and the possibility of successful execution may not be as expected, however. Preserving system resources for the host commands at the time the host commands are received may cause some system resources to be unnecessarily occupied for a long time, thus lowering the efficiency. Hence, the present invention adopts a multi-queue mechanism which assigns different functions for multiple queues thereof, respectively, and more particularly, the memory controller 110 can keep the associated system resource unoccupied until an operation result is available for being sent back to the host device 50 (e.g. the system resource may become occupied when the memory controller 110 is going to send back the operation result to the host device 50). In this way, the problem introduced by executing the host commands can be solved.

Figure 2:
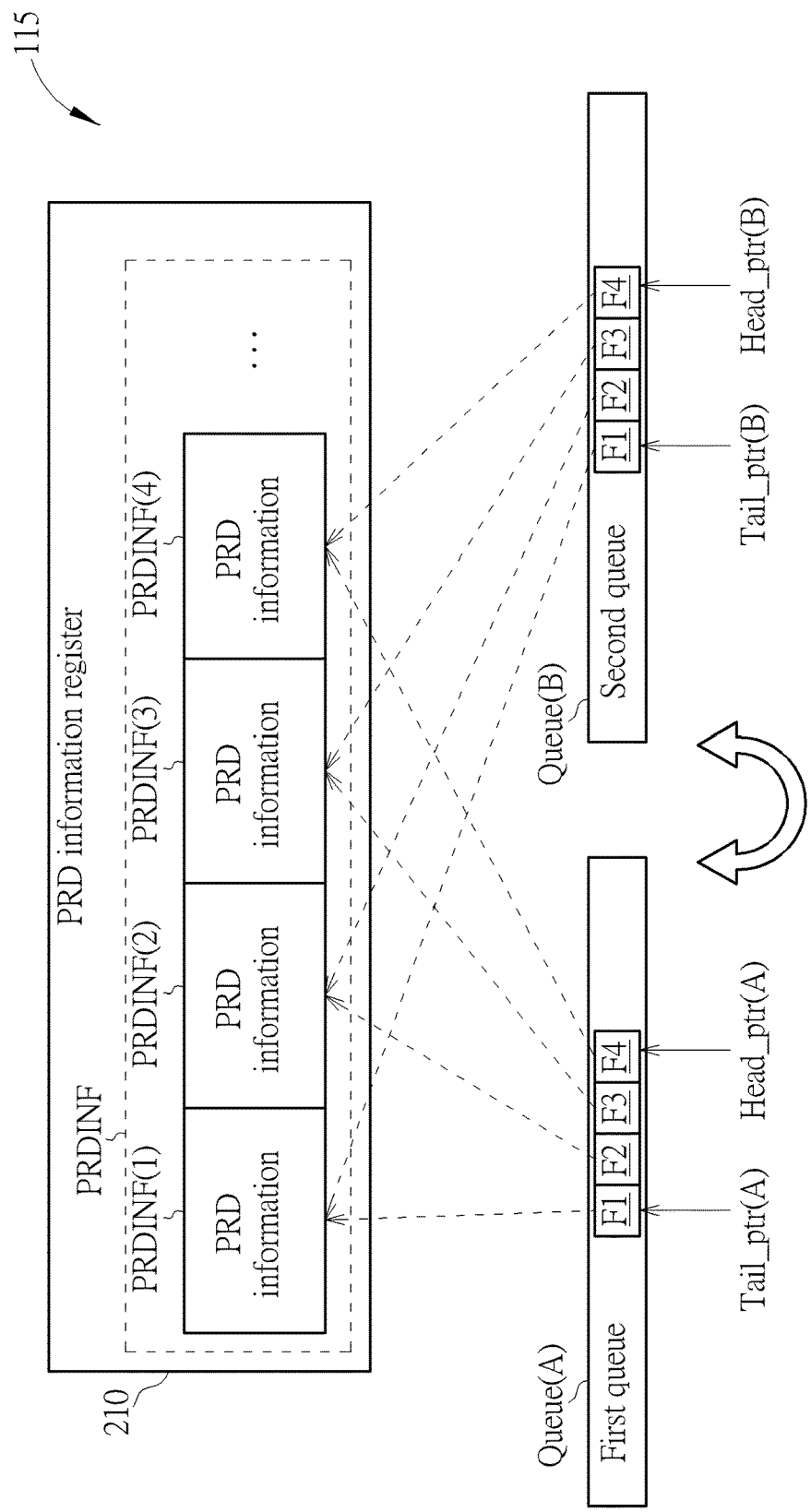
FIG. 2 illustrates some implementation details of the PRD storage module shown in FIG. 1 according to an embodiment of the present invention.

FIG. 2 illustrates some implementation details of the PRD storage module 115 shown in FIG. 1 according to an embodiment of the present invention. The PRD storage module 115 may comprise a PRD information register 210, a first queue Queue(A) and a second queue Queue(B). The first queue Queue (A) and the second queue Queue(B) can be implemented as cyclic buffers, respectively, but the present invention is not limited thereto.

After receiving a plurality of host commands, the microprocessor 112 of the memory controller 110 may store a plurality of sets of PRD information PRDINF related to the plurality of host commands into the PRD information register 210, respectively. The plurality of sets of PRD information PRDINF may comprise the sets of PRD information PRDINF(1), PRDINF(2), PRDINF(3), PRDINF(4), etc., as shown in FIG. 2. According to this embodiment, the sets of PRD information PRDINF maybe parameters related to these host commands. For example, any set of PRD information within the plurality of sets of PRD information PRDINF may comprise: a command identifier (or command ID), logical block address (LBA) of target data, an address of a host device memory, a data-transfer amount, a command type, etc.

Further, according to a flash translation layer (FTL) or a host logical-to-flash physical address mapping table (H2F Table), the microprocessor 112 may obtain the operation parameters required for operating the NV memory elements, such as channel (CH) parameters, chip enabling (CE) parameters, etc., and the operation parameters can be recorded into the PRD information PRDINF. Regarding a write operation, the operation of storing the PRD information PRDINF further comprises recording the address where the user data is temporarily stored, e.g. the address of the user data that is located at a built-in time sharing buffer (TSB) of the memory controller 110, or located in the buffer memory 116.

Under the control of the microprocessor 112, the memory controller 110 may store a plurality of intermediate PRDs respectively corresponding to the plurality of sets of PRD information PRDINF into the first queue Queue(A). Any of the plurality of intermediate PRDs may comprise an identifier (ID) of a set in the plurality of sets of PRD information PRDINF, the address of the set in the plurality of sets of PRD information PRDINF, or the pointer that points toward the address of the set in the plurality of sets of PRD information PRDINF, but the present invention is not limited thereto.

Under the control of the microprocessor 112, the memory controller 110 may arrange the plurality of intermediate PRDs to queue in the first queue Queue(A) or in the second queue Queue(B), as if the plurality of sets of PRD information PRDINF queue in the first queue Queue (A) or in the second queue Queue (B). For example, the memory controller 110 may keep at least one portion (e.g. a portion or all) of the plurality of intermediate PRDs queuing in the first queue Queue(A). In another example, when needed, the memory controller 110 may move one or more intermediate PRDs of the plurality of intermediate PRDs from the first queue Queue(A) to the second queue Queue(B). In another example, when needed, the memory controller 110 may move the one or more intermediate PRDs from the second queue Queue(B) to the first queue Queue(A).

According to this embodiment, a plurality of intermediate PRDs stored in the first queue Queue(A) may represent a first layer of queued PRDs to be processed, and a plurality of intermediate PRDs stored in the second queue Queue(B) may represent a second layer of queued PRDs being processed, wherein the second layer of queued PRDs being processed are preferably obtained from the first layer of queued PRDs to be processed, but the present invention is not limited thereto.

As shown in FIG. 2, the memory controller 110 may utilize the head part pointer Head_ptr(A) and the tail part pointer Tail_ptr (A) to respectively indicate the head part and the tail part of the sequence of the first layer of queued PRDs in the first queue Queue (A). According to this embodiment, the memory controller 110 may obtain a certain intermediate PRD from the tail part of this sequence in the first queue Queue (A), and move this intermediate PRD to the second queue Queue(B) and execute this intermediate PRD; and after the execution is completed, the memory controller 110 may move this intermediate PRD to the head part of this sequence in the first queue Queue(A); but the present invention is not limited thereto.

In an example, at a first time point, the first queue Queue (A) comprises four intermediate PRDs F1, F2, F3 and F4 respectively corresponding to four sets of PRD information PRDINF(1), PRDINF(2), PRDINF(3) and PRDINF(4), wherein the intermediate PRDs F4 and F1 may be respectively located at the head part and the tail part of the sequence in the first queue Queue(A), and during sequentially adding the intermediate PRDs F1, F2, F3 and F4 into the first queue Queue (A), the memory controller 110 may correspondingly make the head part pointer Head_ptr(A) point to the latest added intermediate PRD, in order to update the location of the head part of the sequence in the first queue Queue(A).

At another time point, the memory controller 110 may obtain the intermediate PRD F1 from the tail part of the sequence in the first queue Queue(A), and correspondingly make the tail part pointer Tail_ptr(A) point to the intermediate PRD F2, which means this sequence becomes shorter.

At yet another time point, after the execution of the intermediate PRD F1 is completed, the memory controller 110 may add the executed intermediate PRD F1 into the first queue Queue(A), i.e. a next location outside the current sequence in the first queue Queue(A), such as a location next to (e.g. adjacent to) the intermediate PRD F4, wherein before adding the intermediate PRD F1 into the first queue Queue (A), the memory controller 110 has triggered the host device 50 to read data corresponding to the intermediate PRD F1. In this situation, the set of PRD information PRDINF(1) corresponding to the intermediate PRD F1 has become invalid information. When receiving a new host command, the memory controller 110 may replace the invalid information with a new set of PRD information PRDINF'(1) corresponding to the new host command, and correspondingly move the head part pointer Head_ptr(A) to a right-side location of the intermediate PRD F4 in order to record a new intermediate PRD F1' (which is adjacent to the intermediate PRD F4, at the right-hand side thereof), which means this sequence becomes longer. In this way, as this sequence vary, the head part pointer Head_ptr(A) and the tail part pointer Tail_ptr(A) may vary correspondingly.

Similarly, the memory controller 110 may utilize the head part pointer Head_ptr(B) and the tail part pointer Tail_ptr(B) to respectively indicate the head part and the tail part of a sequence of the second layer of queued PRDs in the second queue Queue(B). According to this embodiment, the memory controller 110 may move a certain intermediate PRD obtained from the first queue Queue(A) to the head part of this sequence in the second queue Queue (B) for future processing, but the present invention is not limited thereto. For example, at a second time point, this sequence comprises two intermediate PRDs F1 and F2 respectively corresponding to two sets of PRD information PRDINF(1) and PRDINF(2), wherein the intermediate PRDs F2 and F1 may be located at the head part and the tail part of this sequence, respectively, and during sequentially adding the intermediate PRDs F1 and F2 into this sequence, the memory controller 110 may correspondingly move the head part pointer Head_ptr(B) to the latest added intermediate PRD, in order to update the location of the head part of this sequence.

The memory controller 110 operates the NV memory 120 according to the PRD information PRDINF(1) corresponding to the intermediate PRD F1. When the operation is successful and an operation result is thereby generated, the memory controller 110 may send back the operation result to the host device 50 according to the PRD information PRDINF(1) corresponding to the intermediate PRD F1. At this moment, the memory controller 110 has completed processing of the intermediate PRD F1. The memory controller 110 may move the processed intermediate PRD F1 from the second queue Queue(B) to the first queue Queue (A), and correspondingly make the tail part pointer Tail_ptr (B) point to the intermediate PRD F2. Assume that the memory controller 110 then completes processing the intermediate PRD F2. The memory controller 110 may move the processed intermediate PRD F2 from the second queue Queue (B) to the first queue Queue(A), and make the tail part pointer Tail_ptr(B) point to the next intermediate PRD (e.g. the intermediate PRD F3 that has just been added) in the second queue Queue(B). In this way, as this sequence vary, the head part pointer Head_ptr(B) and the tail part pointer Tail_ptr(B) may vary correspondingly.

In another embodiment, after sending back the operation results to the host device 50 according to the PRD information PRDINF corresponding to the intermediate PRDs, the memory controller 110 may directly remove the intermediate PRDs from the second queue Queue(B) without further moving the intermediate PRDs to the first queue Queue(A), thereby increasing the execution speed of the host commands.

According to this embodiment, the storage capacity of the PRD information register 210 is sufficient to store M sets of PRD information, the storage capacity of the first queue Queue(A) is sufficient to store MA intermediate PRDs, and the storage capacity of the second queue Queue(B) is sufficient to store MB intermediate PRDs, wherein any of the symbols "M", "MA" and "MB" may represent an integer larger than 1, e.g. M=64, MA=64, and MB=256, but the present invention is not limited thereto.

III. Dynamic Resource Management

The memory controller 110 may queue multiple host commands and sequentially execute the host commands and ultimately send back the operation results to the host device 50. If a plurality of successive host commands all operate on the same NV memory element, rather than uniformly operating on each NV memory element, the system performance will be lowered. The present invention adopts the dynamic resource management to determine the execution order of the host commands. By delaying or adjusting the execution of the host commands, the performance of executing the host commands may be effectively improved.

Figure 3:
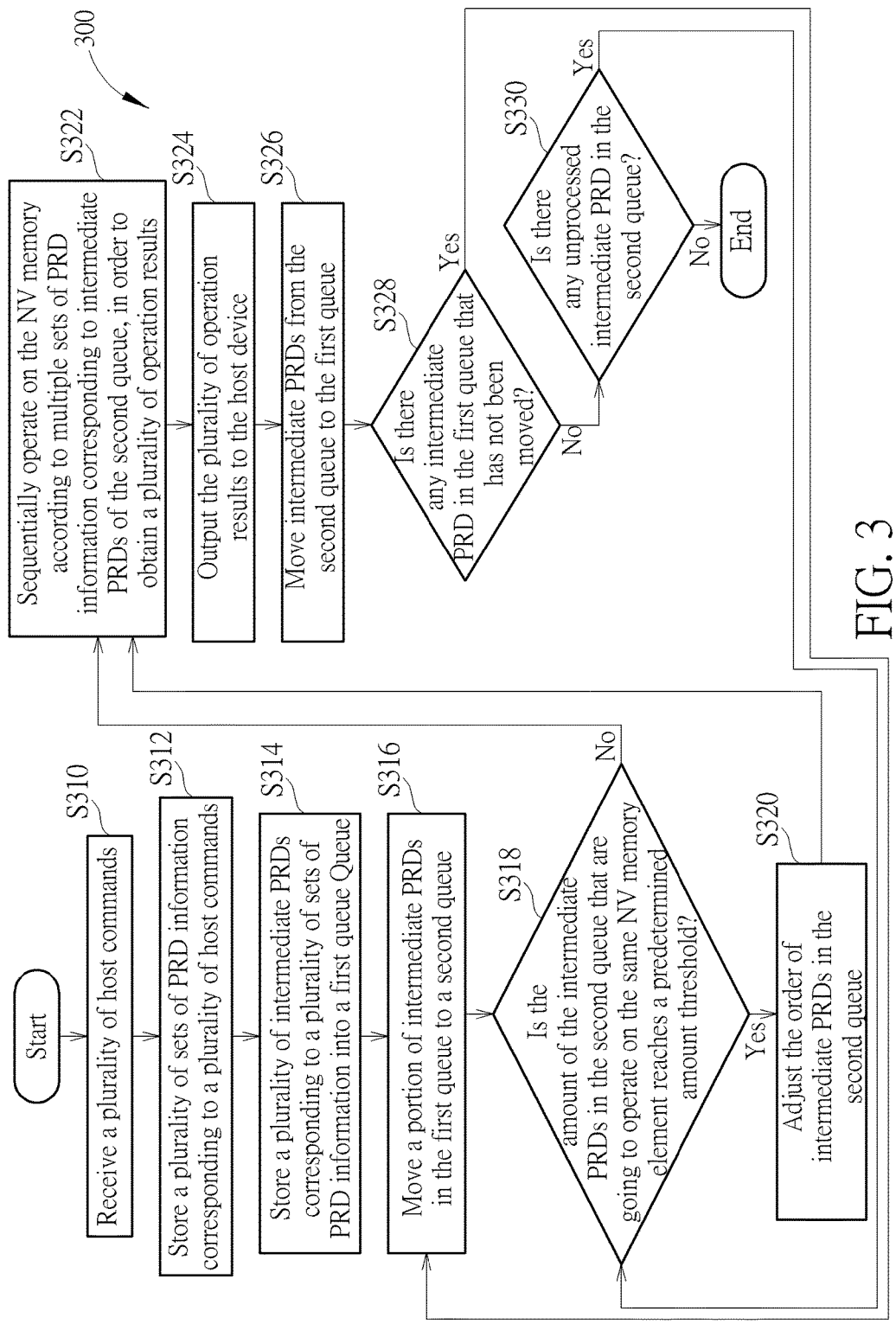
FIG. 3 is a flowchart of a method for performing dynamic resource management in a memory device according to an embodiment of the present invention.

FIG. 3 is a flowchart of a method 300 for performing dynamic resource management in a memory device according to an embodiment of the present invention, wherein the method 300 is applicable to the memory device 100, and is also applicable to the aforementioned controller such as the memory controller 110. For example, under the control of the aforementioned processing circuit such as the microprocessor 112, the memory controller 110 may execute the method 300.

In Step S310, the memory controller 110 may receive a plurality of host commands.

In Step S312, the memory controller 110 may store a plurality of sets of PRD information PRDINF corresponding to a plurality of host commands (e.g. PRDINF(1), PRDINF (2), PRDINF(3), PRDINF(4), etc.). For example, the memory controller 110 may store multiple sets of PRD information PRDINF related to multiple host commands into the PRD information register 210.

In Step S314, the memory controller 110 stores a plurality of intermediate PRDs corresponding to the plurality of sets of PRD information PRDINF into the first queue Queue(A).

In Step S316, the memory controller 110 moves a portion of intermediate PRDs in the first queue Queue(A) to the second queue Queue(B).

In Step S318, the memory controller 110 checks whether the amount of the intermediate PRDs in the second queue Queue(B) that are going to operate on the same NV memory element reaches a predetermined amount threshold. It can be known from the intermediate PRDs or from the respective sets of detailed PRD information corresponding to the intermediate PRDs within the PRD information PRDINF which NV memory element is desired to be read. Taking the NV memory element 122-1 as an example, the memory controller 110 may determine whether the amount of the intermediate PRDs in the second queue Queue(B) that are going to operate on the NV memory element 122-1 reaches the predetermined amount threshold (e.g. 3). Reaching the predetermined amount threshold represents that the memory controller 110 will frequently operate on the NV memory element 122-1, and frequently operating the same NV memory element rather than uniformly operating on each NV memory element will lower the system performance. When the determination result in Step S318 is true, Step S320 is entered; otherwise, Step S322 is entered.

In Step S320, the memory controller 110 adjusts the order of intermediate PRDs in the second queue Queue(B), and then Step S322 is entered. The memory controller 110 moves at least one queued PRD (e.g. the intermediate PRDs that outnumber the predetermined amount threshold) to the tail part of the second queue Queue(B) (i.e. the tail part of the sequence of the second layer of queued PRDs) to postpone the execution of the at least one intermediate PRD (e.g. at least one access operation thereof), but the present invention is not limited thereto. In another embodiment, the memory controller 110 may rearrange the intermediate PRDs of the second queue Queue (B) according to a predetermined interval. For example, among every four intermediate PRDs, only one intermediate PRD is related to operations of the NV memory element 122-1. In another embodiment, the memory controller 110 may insert one intermediate PRD that is not related to operations of the NV memory element 122-1 between two adjacent intermediate PRDs that are related to operations of the NV memory element 122-1. By adjusting the order of multiple intermediate PRDs of the second queue Queue (B), each NV memory element can be uniformly operated in order to achieve the goal of improving the system performance.

In Step S322, the memory controller 110 sequentially operates on the NV memory 120 according to multiple sets of PRD information corresponding to intermediate PRDs of the second queue Queue(B), such as at least one portion (e.g. a portion or all) of the PRD information PRDINF, in order to obtain a plurality of operation results. Based on the work flow of the method 300, the memory controller 110 sequentially operates on the NV memory elements 122-1, 122-2, . . . , and 122-N according to the sets of PRD information PRDINF corresponding to the intermediate PRDs of the second queue Queue(B) in order to obtain the operation results, e.g. obtaining the target data, for storing the operation results into the TSB or the buffer memory 116.

In Step S324, the memory controller 110 outputs the plurality of operation results to the host device 50. The memory controller 110 may output the operation results from the TSB or the buffer memory 116 to the host device 50 according to the aforementioned at least one portion (e.g. a portion or all) of the PRD information PRDINF, e.g. notifying the host device 50 that one or more host commands have been executed and/or triggering the host device 50 to read the target data prepared by the memory controller 110, but the present invention is not limited thereto. According to some embodiments, operations in Step S322 and Step S324 may be performed simultaneously or alternately.

In Step S326, the memory controller 110 may move intermediate PRDs from the second queue Queue(B) to the first queue Queue(A).

In Step S328, the memory controller 110 may check whether there is any intermediate PRD in the first queue Queue(A) that has not been moved, such as any intermediate PRD that has not been moved to the second queue Queue (B). If there is any intermediate PRD in the first queue Queue(A) that has not been moved, Step S316 is entered; otherwise, Step S330 is entered.

In Step S330, the memory controller 110 may check whether there is any unprocessed intermediate PRD in the second queue Queue(B), such as any intermediate PRD corresponding to unexecuted access operation. If there is any unprocessed intermediate PRD in the second queue Queue (B), Step S318 is entered to execute the related operations corresponding to this intermediate PRD that start from Step S318 (e.g. the access operation); otherwise, the work flow of the method 300 is ended, but the present invention is not limited thereto. For example, ending the work flow can be replaced by entering Step S310.

According to this embodiment, regarding any intermediate PRD within the portion of intermediate PRDs mentioned in Step S316, before the intermediate PRD is moved from the first queue Queue(A) to the second queue Queue (B), the intermediate PRD is one of the first layer of queued PRDs. When (or after) the intermediate PRD is moved from the first queue Queue(A) to the second queue Queue(B), the intermediate PRD is removed from the first layer of queued PRDs. For example, before the intermediate PRD is moved from the first queue Queue(A), the intermediate PRD may be located at the tail part of the sequence of the first layer of queued PRDs. When the intermediate PRD is moved from the first queue Queue(A), the memory controller 110 may move the tail part pointer Tail_ptr(A) to indicate the latest location of the tail part of this sequence. Further, before the intermediate PRD within the portion of the intermediate PRDs mentioned in Step S316 is moved from the first queue Queue(A) to the second queue Queue (B), the intermediate PRD has not become one of the second layer of queued PRDs. After the intermediate PRD is moved from the first queue Queue (A) to the second queue Queue (B), the intermediate PRD becomes one of the second layer of queued PRDs.

According to some embodiments, regarding the operation results outputted in Step S324, after the host device 50 reads the operation result of a certain intermediate PRD, the set of PRD information that corresponds to the intermediate PRD may become invalid PRD information, but the present invention is not limited thereto.

According to some embodiments, the intermediate PRDs may also be called firmware PRDs, but the present invention is not limited thereto.

Figure 4:
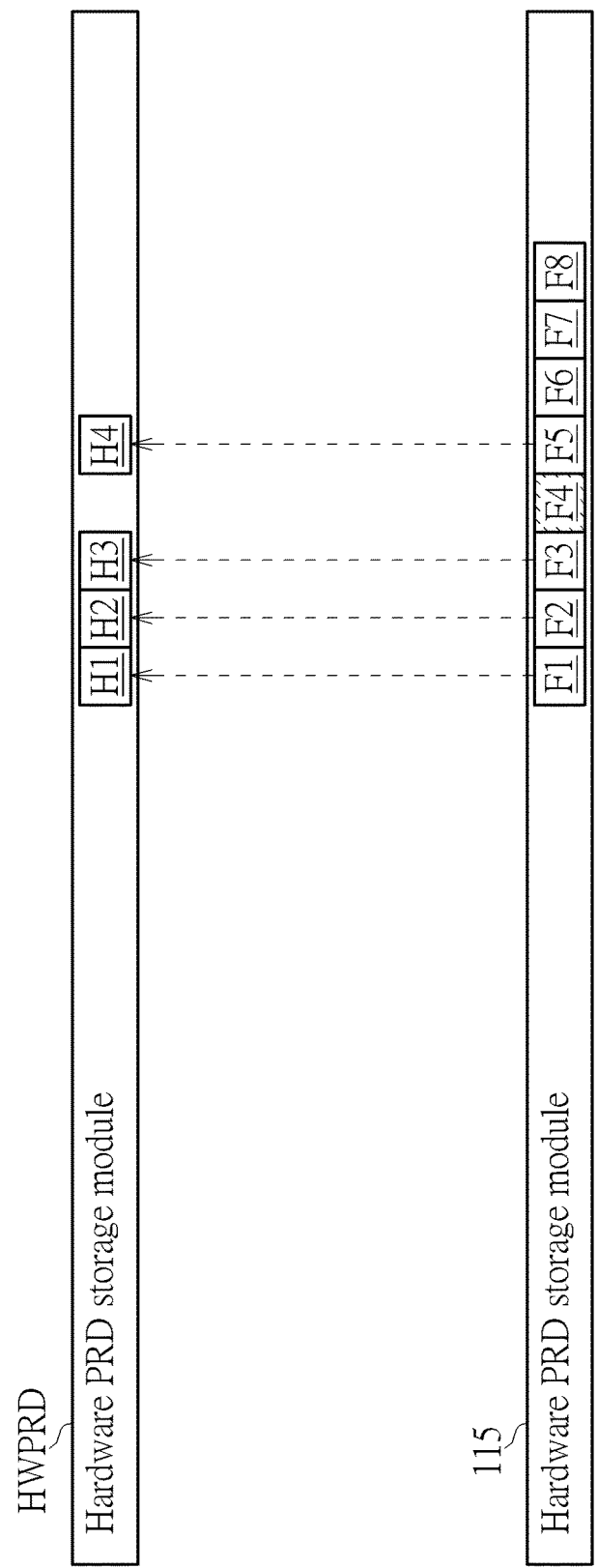
FIG. 4 illustrates a post-assign control scheme of the method shown in FIG. 3 according to an embodiment of the present invention.

FIG. 4 illustrates a post-assign control scheme of the method 300 shown in FIG. 3 according to an embodiment of the present invention. The memory controller 110 may further comprise a hardware PRD storage module HWPRD which belongs to hardware resources of the memory controller 110 and may be directly accessed by the host device 50, wherein the capacity of the hardware PRD storage module HWPRD is sufficient to store MH hardware PRDs, and the symbol "MH" may represent an integer larger than 1 (e.g. 64), but the present invention is not limited thereto. Further, the memory controller 110 may perform some operations based on the method 300. For example, in Step S312, eight sets of PRD information PRDINF respectively corresponding to eight host commands may be stored, and the memory controller 110 has stored eight intermediate PRDs F1, F2, F3, F4, F5, F6, F7 and F8 respectively corresponding to the eight host commands into the first queue Queue(A) of the PRD storage module 115. After the access operations respectively corresponding to four intermediate PRDs F1, F2, F3 and F5 are performed, the intermediate PRDs F1, F2, F3 and F5 will have been released from the second queue Queue(B) to the first queue Queue (A), the corresponding operation results will have been prepared in the TSB, and the intermediate PRD F4 is moved to the tail part of the sequence of the second layer of queued PRDs in order to delay an access operation regarding the intermediate PRD F4. The memory controller 110 may trigger the host device 50 to automatically read the operation result (e.g. by mapping the intermediate PRDs F1, F2, F3 and F5 onto the hardware PRDs H1, H2, H3 and H4 in the hardware PRD storage module HWPRD, respectively), thus preventing problems existing in the related art techniques. More particularly, before the access operation regarding the intermediate PRD F4 is successful, the memory controller 110 does not occupy any resource in the hardware PRD storage module HWPRD. In this way, the problem of the hardware PRD storage module HWPRD being occupied may be prevented. Hence, under the situation where the capacity of the hardware PRD storage module HWPRD is limited, the memory controller 110 may reach optimal performance of the memory device 100 without introducing side effects or in a way that is less likely to introduce side effects.

Figure 5:
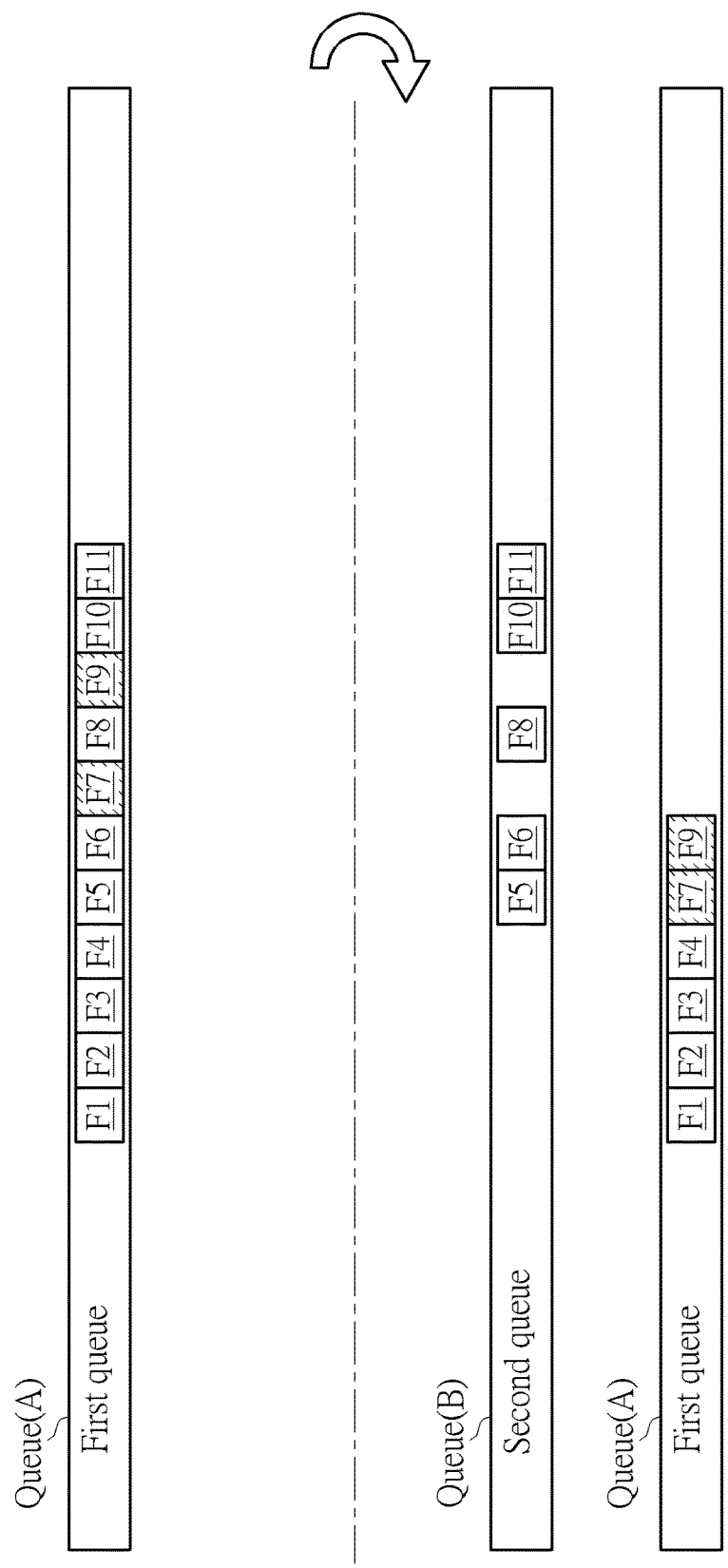
FIG. 5 illustrates a multi-queue control scheme of the method shown in FIG. 3 according to an embodiment of the present invention.

FIG. 5 illustrates a multi-queue control scheme of the method 300 shown in FIG. 3 according to an embodiment of the present invention. The memory controller 110 may perform some operations based on the method 300. For example, the memory controller 110 stores eleven sets of PRD information PRDINF respectively corresponding to eleven host commands, and stores eleven intermediate PRDs F1, F2, F3, F4, F5, F6, F7, F8, F9, F10 and F11 respectively corresponding to the eleven host commands into the first queue Queue(A). In the second queue Queue(B), after the access operations respectively corresponding to the intermediate PRDs F1, F2, F3, F4, F7 and F9 are completed, the intermediate PRDs F1, F2, F3, F4, F7 and F9 have been moved from the second queue Queue(B) to the first queue Queue(A) and the operation results has been stored into the TSB, wherein the intermediate PRDs F5, F6, F8, F10 and F11 may remain queued in the second queue Queue (B) for future processing, without interfering with the access operations respectively corresponding to the intermediate PRDs F1, F2, F3, F4, F7 and F9. Hence, with the aid of the multi-queue control, the memory controller 110 may reach optimal performance of the memory device 100 without introducing side effects or in a way that is less likely to introduce side effects.

Figure 6:
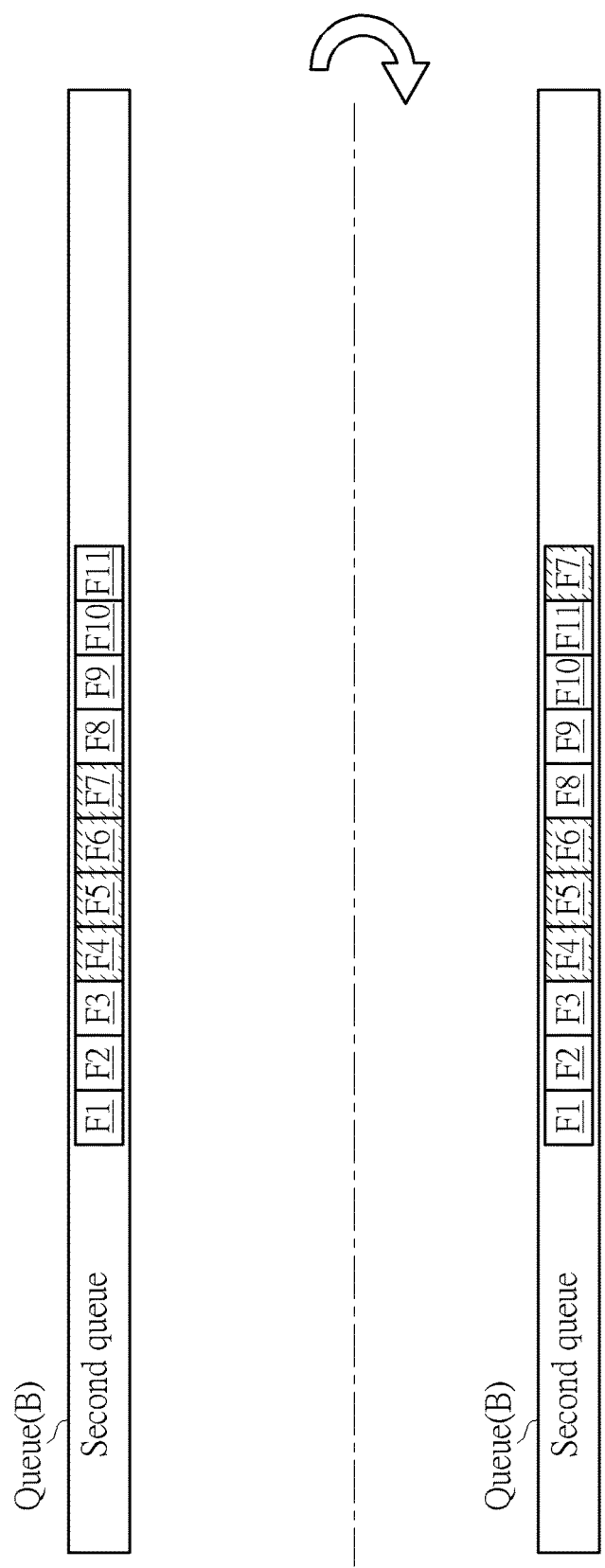
FIG. 6 illustrates a time sharing buffer (TSB) resource management scheme of the method shown in FIG. 3 according to an embodiment of the present invention.

FIG. 6 illustrates a time sharing buffer (TSB) resource management scheme of the method 300 shown in FIG. 3 according to an embodiment of the present invention. The memory controller 110 may check whether the amount of queued PRDs for accessing the same NV memory element (e.g. one of the NV memory elements 122-1, 122-2, . . . , and 122-N) within the second layer of queued PRDs (in the second queue Queue (B)) reaches the predetermined amount threshold, which may equal 3, but is not limited thereto. Assume that within the intermediate PRDs F1, F2, F3, F4, F5, F6, F7, F8, F9, F10 and F11, only the intermediate PRDs F4, F5, F6 and F7 are arranged to access the same NV memory element. In this situation, the memory controller 110 may push the intermediate PRD F7 to the tail part of the sequence of the second layer of queued PRDs, in order to delay the access operation corresponding to the intermediate PRD F7, thereby rearranging hardware resources for the TSB. Hence, the memory controller 110 may properly manage the hardware resources of the TSB based on the sequentially operating characteristic of the TSB, in order to reach optimal performance of the memory device 100 without introducing side effects or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing dynamic resource management in a memory device, the memory device comprising a non-volatile (NV) memory, the NV memory comprising a plurality of NV memory elements, and the method comprising:
storing a plurality of sets of physical region descriptor (PRD) information related to a plurality of host commands, respectively, and storing a plurality of intermediate PRDs respectively corresponding to the plurality of sets of PRD information into a first queue, wherein the plurality of host commands are received from outside the memory device, and any of the plurality of intermediate PRDs comprises an identifier (ID) of a set in the plurality of sets of PRD information;
obtaining an intermediate PRD of the plurality of intermediate PRDs from the first queue, and storing the intermediate PRD into a second queue;
sending a command to the NV memory according to the intermediate PRD in the second queue, to access data in at least one NV memory element of the plurality of NV memory elements; and
when an operation of accessing the data is successful, releasing the intermediate PRD from the second queue to the first queue.

2. The method of claim 1, wherein a plurality of PRDs stored in the first queue represents a first layer of queued PRDs to be processed; and a plurality of PRDs stored in the second queue represents a second layer of queued PRDs being processed.

3. The method of claim 2, further comprising:
utilizing a first pointer and a second pointer to indicate a head part and a tail part of a sequence of the first layer of queued PRDs, respectively.

4. The method of claim 2, wherein before the intermediate PRD is moved from the first queue to the second queue, the intermediate PRD is one of the first layer of queued PRDs; and when the intermediate PRD is moved from the first queue to the second queue, the intermediate PRD is removed from the first layer of queued PRDs.

5. The method of claim 4, further comprising:
utilizing a first pointer and a second pointer to indicate a head part and a tail part of a sequence of the first layer of queued PRDs, respectively, wherein before the intermediate PRD is moved from the first queue, the intermediate PRD is located at the tail part of the sequence; and
when the intermediate PRD is moved from the first queue, moving the second pointer to indicate a latest location of the tail part of the sequence.

6. The method of claim 2, further comprising:
utilizing a first pointer and a second pointer to indicate a head part and a tail part of a sequence of the second layer of queued PRDs, respectively.

7. The method of claim 2, wherein before the intermediate PRD is moved from the first queue into the second queue, the intermediate PRD has not become one of the second layer of queued PRDs; and after the intermediate PRD is moved from the first queue into the second queue, the intermediate PRD becomes one of the second layer of queued PRDs.

8. The method of claim 2, further comprising:
checking whether an amount of queued PRDs for accessing a same NV memory element within the plurality of NV memory elements within the second layer of queued PRDs reaches a predetermined amount threshold; and
when the amount of the queued PRDs for accessing the same NV memory element reaches the predetermined amount threshold, moving at least one queued PRD within the queued PRDs to a tail part of a sequence of the second layer of queued PRDs, to postpone at least one access operation of the at least one queued PRD.

9. The method of claim 2, wherein the plurality of host commands are received from a host device external to the memory device; and the method further comprises:
triggering the host device to read the data, wherein after the host device reads the data, a set of PRD information corresponding to the intermediate PRD becomes invalid information.

10. The method of claim 1, wherein the plurality of sets of PRD information are parameters related to the plurality of host commands; and any set of PRD information within the plurality of sets of PRD information comprises a command ID, a logical block address (LBA) of target data, a data-transfer amount, and a command type.

11. A memory device, comprising:
a non-volatile (NV) memory, arranged to store information, wherein the NV memory comprises a plurality of NV memory elements; and
a controller, coupled to the NV memory, the controller arranged to control operations of the memory device, wherein the controller comprises:

a multi-queue type physical region descriptor (PRD) storage module, arranged to store at least one PRD, wherein the multi-queue type PRD storage module comprises:
   a PRD information register;
   a first queue; and
   a second queue; and
a processing circuit, arranged to control the controller according to a plurality of host commands from a host device, to allow the host device to access the NV memory via the controller, wherein:
   the controller stores a plurality of sets of PRD information related to the plurality of host commands into the PRD information register, respectively, and stores a plurality of intermediate PRDs respectively corresponding to the plurality of sets of PRD information into the first queue, wherein any of the plurality of intermediate PRDs comprises an identifier (ID) of a set in the plurality of sets of PRD information;
   the controller obtains an intermediate PRD of the plurality of intermediate PRDs from the first queue, and stores the intermediate PRD into the second queue;
   the controller sends a command to the NV memory according to the intermediate PRD in the second queue, to access data in at least one NV memory element of the plurality of NV memory elements; and
   when an operation of accessing the data is successful, the controller releases the intermediate PRD from the second queue to the first queue.

12. The memory device of claim 11, wherein a plurality of PRDs stored in the first queue represents a first layer of queued PRDs to be processed; and a plurality of PRDs stored in the second queue represents a second layer of queued PRDs being processed.

13. The memory device of claim 12, wherein the controller utilizes a first pointer and a second pointer to indicate a head part and a tail part of a sequence of the first layer of queued PRDs, respectively.

14. The memory device of claim 12, wherein before the intermediate PRD is moved from the first queue to the second queue, the intermediate PRD is one of the first layer of queued PRDs; and after the intermediate PRD is moved from the first queue to the second queue, the intermediate PRD is removed from the first layer of queued PRDs.

15. The memory device of claim 14, wherein the controller utilizes a first pointer and a second pointer to indicate a head part and a tail part of a sequence of the first layer of queued PRDs, respectively, wherein before the intermediate PRD is moved from the first queue, the intermediate PRD is located at the tail part of the sequence; and when the intermediate PRD is moved from the first queue, the controller moves the second pointer to indicate a latest location of the tail part of the sequence.

16. A controller of a memory device, the memory device comprising the controller and a non-volatile (NV) memory, the NV memory comprising a plurality of NV memory elements, the controller comprising:
   a multi-queue type physical region descriptor (PRD) storage module, arranged to store at least one PRD, wherein the multi-queue type PRD storage module comprises:
      a PRD information register;
      a first queue; and
      a second queue; and
   a processing circuit, arranged to control the controller according to a plurality of host commands from a host device, to allow the host device to access the NV memory via the controller, wherein:
      the controller stores a plurality of sets of PRD information related to the plurality of host commands into the PRD information register, respectively, and stores a plurality of intermediate PRDs respectively corresponding to the plurality of sets of PRD information into the first queue, wherein any of the plurality of intermediate PRDs comprises an identifier (ID) of a set in the plurality of sets of PRD information;
      the controller obtains an intermediate PRD of the plurality of intermediate PRDs from the first queue, and stores the intermediate PRD into the second queue;
      the controller sends a command to the NV memory according to the intermediate PRD in the second queue, to access data in at least one NV memory element of the plurality of NV memory elements; and
      when an operation of accessing the data is successful, the controller releases the intermediate PRD from the second queue to the first queue.

17. The controller of claim 16, wherein a plurality of PRDs stored in the first queue represents a first layer of queued PRDs to be processed; and a plurality of PRDs stored in the second queue represents a second layer of queued PRDs being processed.

18. The controller of claim 17, wherein the controller utilizes a first pointer and a second pointer to indicate a head part and a tail part of a sequence of the first layer of queued PRDs, respectively.

19. The controller of claim 17, wherein before the intermediate PRD is moved from the first queue to the second queue, the intermediate PRD is one of the first layer of queued PRDs; and after the intermediate PRD is moved from the first queue to the second queue, the intermediate PRD is removed from the first layer of queued PRDs.

20. The controller of claim 19, wherein the controller utilizes a first pointer and a second pointer to indicate a head part and a tail part of a sequence of the first layer of queued PRDs, respectively, wherein before the intermediate PRD is moved from the first queue, the intermediate PRD is located at the tail part of the sequence; and when the intermediate PRD is moved from the first queue, the controller moves the second pointer to indicate a latest location of the tail part of the sequence.

* * * * *